Aug. 21, 1951     C. E. NORTH     2,564,715
CONTINUOUS APPARATUS FOR MAKING BUTTER
Filed Sept. 26, 1946     2 Sheets-Sheet 1
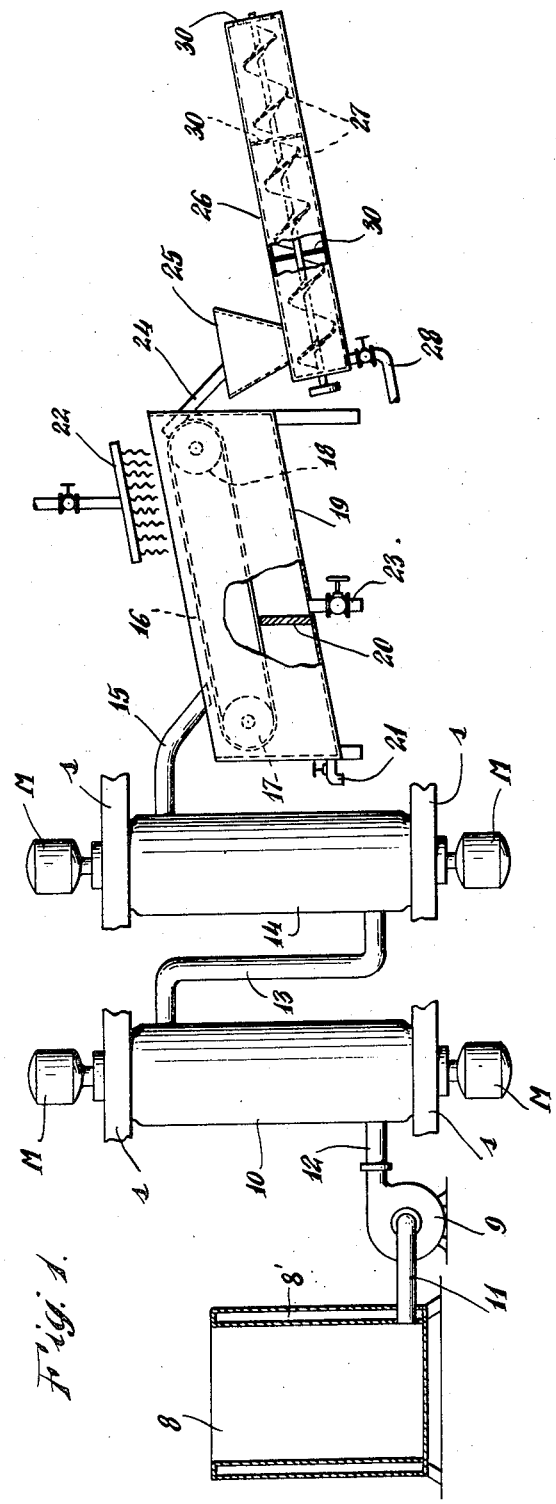
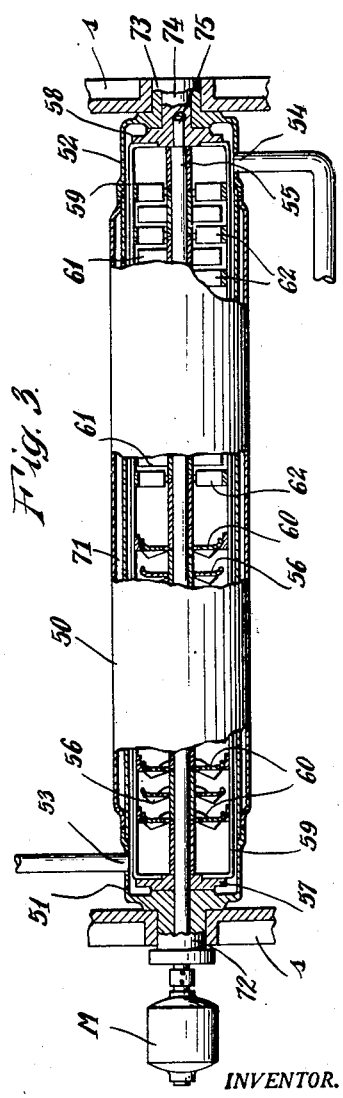
INVENTOR.
Charles E. North
BY
ATTORNEY.

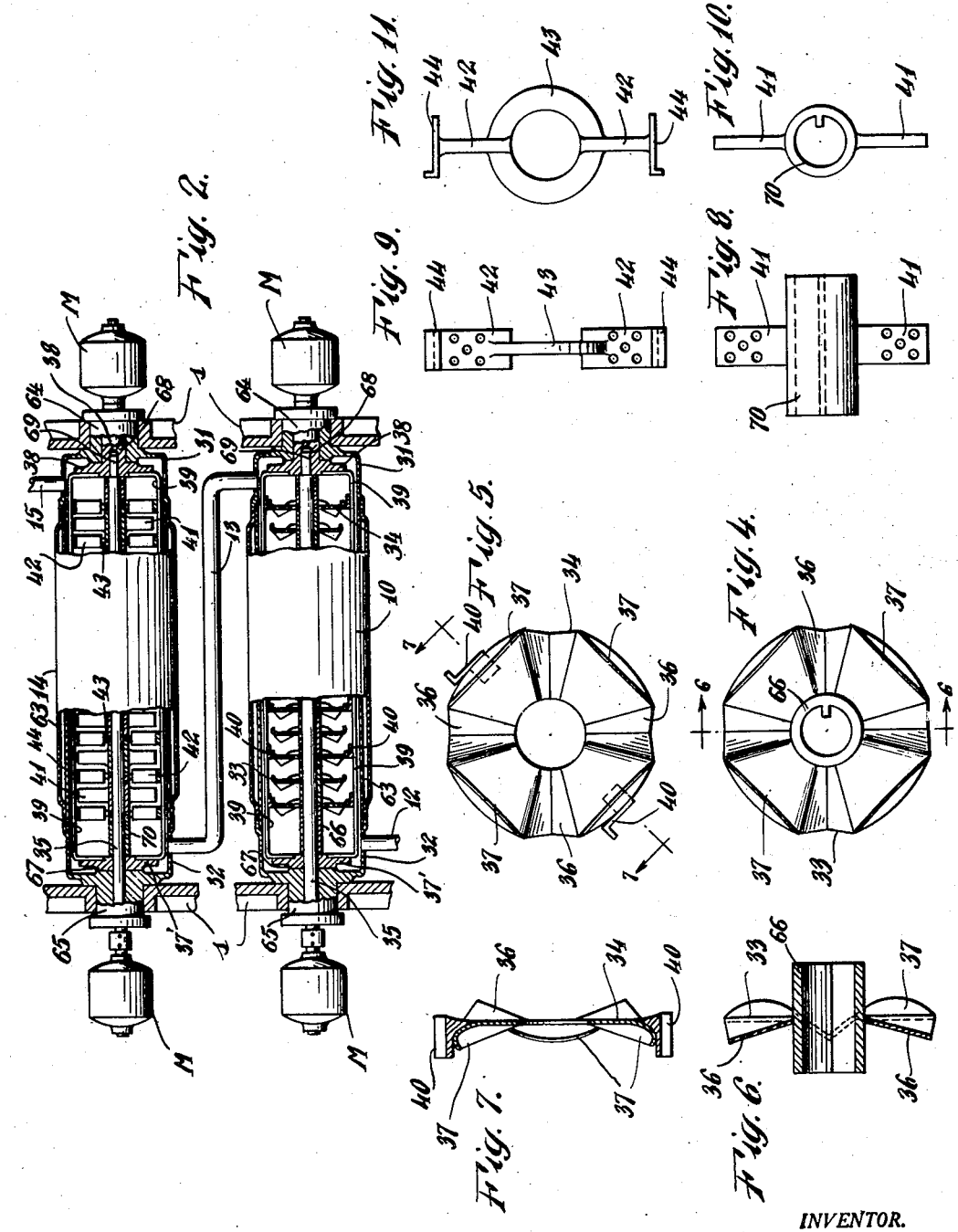

Patented Aug. 21, 1951

2,564,715

UNITED STATES PATENT OFFICE 2,564,715

CONTINUOUS APPARATUS FOR MAKING BUTTER

Charles E. North, Montclair, N. J.

Application September 26, 1946, Serial No. 699,520

2 Claims. (Cl. 31—33)

This invention relates to the making of butter from fluid cream, and it is the object of the invention to provide an improved apparatus for making butter from fluid cream.

In the making of butter from fluid cream changing the fluid cream into butter is not a simple procedure but is marked by several abrupt changes of the constituents of the cream. Fluid cream as is well known is composed of water holding in solution milk solids, milk sugar and salts and the proteins, casein, albumen and lecithin, constituting emulsifying agents, in colloidal form. It also holds in suspension fine particles or globules of milk fat which are emulsified by the coating and union of the fat globules with the emulsifying agents.

When fluid cream is agitated in the presence of air, for example, by dashers in a box or barrel, the cream changes in due time to a fluffy mass impregnated with air in the form of bubbles, and the water or liquid content of the cream is no longer free but is encased in the fluffy mass called "whipped cream."

In carrying out the initial step in the present invention fluid cream is continuously fed into a zone substantially devoid of air and is caused to be displaced and passed through said zone by cream fed therein. The cream in its passage through said zone is subjected to a whipping action. The whipping action converts the cream into a semi-solid or plastic state, herein called "plastic cream." The whipping action also causes the fat globules which are dispersed through the fluid cream to unite and assemble themselves into chains, clusters and loops to form a network surrounding relatively large spaces containing water or liquid content of the cream therein.

The distinguishing features between so-called "whipped cream" and "plastic cream" have been emphasized because in the continuous process of making butter from fluid cream in accordance with the present invention the converting of the fluid cream into "plastic cream" constitutes an essential feature of the invention.

A successive step in carrying out the invention is the continuous delivery of the plastic cream as it is displaced from the whipping zone into and passing the same through a second agitating zone substantially devoid of air. In the second zone the fat globules are agglomerated into granules and masses of fat and the plastic cream is changed into a mixture of granules and masses of butterfat globules and buttermilk by subjecting the plastic cream to the beating action of paddles in its passage through said second zone. The mixture of granules and masses of butterfat globules are displaced from said second zone by the delivery therein of the plastic cream displaced from the whipping zone. Then the buttermilk is drained from the mixture and the granules and masses of butterfat granules are washed. The washed mixture is then worked In the drawings accompanying and forming a part of this specification there is shown apparatus for carrying out the invention, wherein Figure 1 is a side elevation, partly in section, of the apparatus.

Figure 2 is a sectional view of the means for converting fluid cream into a plastic state and for changing the latter into butter and buttermilk.

Figure 3 is a modified arrangement of the means for converting fluid cream into a plastic state and for changing the latter into butter and buttermilk.

Figure 4 is a face view of a member or element of a series of elements for subjecting fluid cream to a whipping action in the whipping zone to convert fluid cream into a plastic state adapted to be fixed on a shaft to rotate therewith.

Figure 5 is a view similar to Figure 4 of an element of another series of elements for subjecting fluid cream to a whipping action and convert fluid cream into a plastic state adapted to be fixed at peripheral portions to a frame to rotate therewith.

Figures 6 and 7 are sectional views taken substantially on the lines 6—6 and 7—7 of Figures 4 and 5 respectively.

Figure 8 is a side elevation of a beater paddle of one series of said elements in the zone for changing the plastic cream into butter and buttermilk.

Figure 9 is a view similar to Figure 8 of a beater paddle of another series of said elements arranged for securing the same at peripheral portions to a frame to rotate therewith; and Figures 10 and 11 are views looking at the side of Figures 8 and 9 respectively.

In carrying out the invention the fluid cream is cooled to a temperature of from 40 to 48 degrees F. and filled into a tank 8. The side wall of tank 8 is provided with a jacket 8' for the circulation of a cooling medium to maintain the cream in cooled condition. The fluid cream is fed from the tank by a pump, shown in a conventional manner at 9, into and through a chamber in a closed cylindrical casing 10 constituting the whipping zone and having means therein operative to agitate the fluid cream and subject it to a whipping action to convert the fluid cream into plastic cream. The chamber in casing 10 is filled with cream fed therein and is thus substantially devoid of air. The inlet of the pump 9 is connected by a pipe or conduit 11 to the lower portion of the tank 8 and the outlet is connected by a pipe or conduit 12 to an inlet to one end of the casing 10. The plastic cream is continuously discharged from the casing 10 through a pipe or conduit 13 connected to an outlet from the end of the casing 10 opposite the end with the inlet and to an inlet to one end of a chamber in a second casing 14. The plastic cream fed into the chamber in casing 14 fills said chamber and thus said casing chamber is substantially devoid of air. The fat content of the fat globules in the plastic cream in its passage through said casing chamber 14 is agglomerated into granules and masses and the plastic cream is changed into a mixture of butterfat granules and buttermilk by subjecting the same to the beating action of revolvable paddles. The chamber of casing 14 constitutes the second agitating zone. The mixture of butterfat granules and buttermilk in the casing chamber 14 is discharged through a conduit 15 onto one end portion of a travelling perforated belt conveyer 16. The conveyer belt is supported by a pair of rotatable drums 17, 18, one of which drums is driven from a suitable source of power. The drum 18 is in a higher horizontal plane than the drum 17 to have the conveyer in a plane inclining from the drum 17 to the drum 18. The conveyer supporting drums are rotatably supported in the upper portion of a tank 19 also inclining in the direction of inclination of the conveyor and is separated by a transverse partition 20 into two compartments. The buttermilk as it is discharged with the granules and masses of butterfat globules onto the conveyer and is transported by the conveyer drains into one compartment of the tank 19 from which it is withdrawn through a valve controlled outlet member 21. The butterfat granules from which the buttermilk has been drained as they are transported by the conveyer are washed by subjecting the same to streams of water from a spray head 22 connected to a cold water supply. The wash water drains from the butterfat granules into the other compartment in the tank 19 from which it is withdrawn through a valve controlled outlet member 23. The partition 20 prevents the mixing of the wash water with the buttermilk in the tank 19. The washed butterfat granules are delivered from the conveyer into a chute 24 whereby they are directed into a hopper inlet member 25 to means for working the butter. As shown this butter working means consists of an elongated cylindrical housing 26 to one end of which the hopper inlet member 25 opens. The housing inclines upwardly at a slight angle to the horizontal from said end and rotatably supports screw conveyer means 27 therein. The lower end of the housing is closed and is arranged with a valve controlled outlet member 28 at said end for withdrawing water from the conveyer housing. Transverse partitions spaced along the housing and a closure at the opposite end of the housing are arranged with openings or perforations, as indicated at 30, through which the butter is forced as it is fed by the conveyer screw. The conveyer screw and the partitions and end closure separate occluded or entrained water and buttermilk from the butter, or work water into the butter, the butter being discharged from the conveyer housing through the perforations in the end closure 30.

In Figure 2 there is illustrated in section the casings 10 and 14 and the means operative therein for converting fluid cream into plastic cream and in continuous sequence agglomerate the fat globules in the plastic cream into granules and masses and change the plastic cream into a mixture of butterfat granules and buttermilk. The casings 10 and 14 are supported in either vertical or horizontal position, but preferably in horizontal position. The structure of the casings 10 and 14 is the same, each including a cylindrical body having heads 31, 32 closing the opposite ends. The head 32 of casing 10 has an inlet to which the pump connecting pipe 12 is connected. The head 31 of casing 10 has the outlet connected by the pipe 13 to the inlet in head 32 of casing 14. The outlet in head 31 of the latter casing 14 is connected to the discharge conduit 15. The cylindrical body of each casing is provided with a jacket 63 for the circulation of a cooling medium, and each of the casing heads 31, 32 is arranged with an outwardly extending trunnion 64, 65, respectively, for mounting the casings in supports s.

Two sets or series of agitators, herein called "whippers," in the form of disks 33 and 34 (Figures 4 to 7) are rotatably mounted in the whipper casing 10 with the disks 33 of one series alternately disposed with and spaced from the disks 34 of the other series and each series of disks having independent rotation on the axis of the casing. Each of the disks 33 is arranged with an axial hub 66 whereby they are mounted on a shaft 35 with the hubs abutting and predeterminedly spacing the disks along the shaft and secured to the shaft to rotate therewith in planes at a right angle to the axis of the shaft, as by a key in the disk hubs engaging a keyway in the shaft and the hubs carrying the end disks secured to the shaft, as by a set screw, to hold the disks against axial displacement on the shaft. The shaft 35 is journalled at one end in and projects through the trunnion 65 of the head 32 of the casing.

The disks 33 and 34 are arranged with radially extending flutes or corrugations equidistantly spaced about the disks and shown as four in number. The corrugations are of V-form of progressively increasing cross section or width outwardly from the axis to the periphery of the disks with the sides opening to a surface of the disks, as at 36. The portions of the disks between the corrugations are of arcuate form in cross section with the concave face thereof at the side of the disks from which the wall of the corrugations projects, and the peripheral portion of said disk portions is crimped or flanged, as at 37, to extend laterally from the convex face of said disk portions and arranging the same substantially to scallop form.

The disks 34 are provided with an enlarged axial opening, instead of a hub as the disks 33, for the engagement of the hubs of disks 33 and are fixed at peripheral portions to a frame rotatable in the casing 10 and supporting the disks 34 in interposed relation and spaced from the disks 33. The frame consists of a pair of heads 37', 38, the head 37' having an axial trunnion 67 for the passage and rotatable support of said frame head upon the shaft 35. The frame head 38 is arranged with an elongated trunnion 68 journalled in and projecting from the trunnion 64 of casing head 31 and the shaft 35 has a pilot bearing 69 in said head. The frame heads are connected by diametrically opposite bars 39 fixed at the opposite ends to the heads and the disks are fixed to said bars by angle brackets fixed to diametrically opposite portions at the periphery of the disks 33, as at 40. The disks 33 and 34 are assembled with the faces from which the V wall of the corrugations project opposed to the casing head 32 having the inlet to the casing, and with the projecting wall of the corrugations of successive disks opposed to the open side of the corrugations of preceding disks. The disk carrying frame and shaft 35 and therewith the disks 33 are rotated in opposite directions from a suitable source of power, and shown as electric motors M, one operatively connected to the end of the shaft 35 projecting from the trunnion 65 of casing head 32 and the other connected to the projecting end of the trunnion 68 of the frame head 38.

The flow of the fluid cream through the casing 10 as it is fed therein by the pump is opposed by the disks 33 and 34. However, the disks are of less diameter than the internal diameter of the casing with the result that the pressure of the cream causes the cream to flow about the periphery of the disks and radially inward relative to the channels of the corrugations of the disks and then caused to flow radially outward relative to the portions of the disks between the corrugations which flow is retarded by the flanges or crimps at the periphery of said portions of the disks. The rotation of the two series of disks in opposite directions imparts a whipping action to the fluid cream converting it into a plastic state and the friction between the disks and cream resulting from the rotation of the disks and the alternate to and fro movement imparted to the cream breaking the adhesion between the butterfat globules and the colloid of emulsifying constituents of the cream and causing the butterfat globules, which are substantially solid due to the cooling of the cream to a temperature of 48° F., to assemble and unite in chains and the chains of butterfat globules to form clusters and loops surrounding relatively large spaces encasing and enmeshing the liquid content of the cream. The plastic cream is displaced in the casing 10 from the inlet end to the outlet end and discharged from the casing through the outlet by the continuous feeding of the fluid cream into the casing.

A shaft and a frame similar to the shaft 35 and frame 37', 38, 39 are rotatably mounted in the casing 14 and rotated in opposite directions by motors operatively connected to the projecting end of the shaft 35 and trunnion 68 of the frame head 38 projecting from the trunnion 64 of the casing head 31 as described and said elements have been given the same reference characters. As stated, the plastic cream displaced from the casing 10 is fed or discharged continuously into the casing 14 and the material is displaced from the latter by the continuous feeding of the plastic cream therein so that the casing is filed with material and substantially devoid of air. The plastic cream in its passage through the casing 14 is subjected to the beating action or impacts of paddles or blades and thereby agglomerating the fat globules of the plastic cream into granules and masses and changing the plastic cream into butter and buttermilk. For this purpose paddles or blades 41 of one series of paddles or blades are fixed to or integral with and extend radially from hubs 70 whereby they are mounted on the shaft with the hubs in endwise juxtaposed relation and keyed to the shaft to rotate therewith by keys in the paddle hubs engaging a keyway in the shaft and held against axial displacement on the shaft by set screws threaded into openings in the end paddle carrying hubs and engaged with the shaft. Paddles or blades 42 of another series are integral with and extend diametrically from ring portions 43 adapted to engage about the hubs carrying the paddles 41 and the paddles 42 are arranged at the end with an angular portion or bracket 44 for engagement with and whereby the paddles 42 are secured to the frame bars 39 to extend radially inward from said bars in interposed and spaced relation to the paddles 41. The width of the paddles or blades extend in planes parallel of the axis of rotation of the frame and shaft and the direction of flow of material in the casing. The paddles 41 and 42 are provided with openings or perforations whereby as the paddles are revolved and impact against the plastic cream the liquid or water content thereof will pass through said perforations and facilitate the agglomerating of the fat globules of the plastic cream and changing of the plastic cream into a mixture of butterfat granules and buttermilk.

In the operation of the apparatus shown in Figure 2 the disk and blade carrying shafts 35 and the disk and blade carrying frames 37', 38, 39 are rotated simultaneously in opposite directions. Fluid cream is then pumped into the casing 10 and forced therethrough relative to the rotating disks 33, 34. The direction of flow of the cream is casing 10 in against the faces of the rotating disks. As the fluid cream is passed through casing 10 the fluid cream is changed through the action of the disks 33, 34 into plastic cream and as such is discharged from the casing 10 into casing 14 and forced therethrough relative to the revolving blades 41, 42 which act on the plastic cream to agglomerate the fat content thereof into granules and masses of fat and changes it into a mixture of butterfat granules and masses and buttermilk. The direction of flow of the material through casing 14 is parallel to or across the faces of the revolving blades. The mixture of butter fat granules and buttermilk is discharged from casing 14 onto a travelling conveyer and as the mixture is transported thereby the buttermilk drains from the butter granules and the butter granules are washed. Due to the continuous feeding of the fluid cream into and continuously through the casing 10, and the continuous discharge of the plastic cream from casing 10 into casing 14, both of these casings will be substantially filled at all times with the material undergoing treatment. The changing of fluid cream into plastic cream and of plastic cream into agglomerated butter granules and buttermilk, therefore, will take place in zones substantially devoid of air.

In Figure 3 there is illustrated a modified form of the apparatus for making butter from fluid cream by converting the fluid cream into plastic cream and in continuous sequence agglomerating the butterfat granules of the plastic cream into granules and masses and change the plastic cream into granules of butterfat and buttermilk. The apparatus comprises a casing including an elongated cylindrical body 50 arranged with a jacket 71 for the circulation of a suitable fluid cooling medium and having heads 51, 52 connected to and closing the opposite ends. The head 51 has an inlet 53 to which the pump 9 is adapted to be connected to feed fluid cream into the casing, and the head 52 arranged with an outlet 54 for the discharge of the material from the casing, and each of said heads having an outwardly extending trunnion 72, 73, respectively. The end portion of the casing to which the inlet opens and extending for something less than one-half the length of the casing constitutes the whipping zone in which the fluid cream is converted into a plastic state. The end portion of the casing to which the outlet opens and extending for something less than one-half the length of the casing constitutes the zone in which the plastic cream is agitated to agglomerate the butterfat globules of the plastic cream into granules and masses and change the plastic cream into a mixture of butterfat granules and buttermilk.

A shaft 55 has mounted on one end portion thereof disposed in the whipping zone disks 56 similar in construction and arrangement to the disks 33 and the mounting thereof on the shaft 35 in the casing 10. Paddles or blades 61 are mounted on the opposite end portion of the shaft 55 to be disposed in the agitating zone for changing the plastic cream into butterfat granules and buttermilk similar to the paddles 41 and the mounting thereof on the shaft in the casing 14. One end of the shaft 55 is journalled in and projected through the trunnion 72 of casing head 51. A frame including a head 57 rotatably supported upon the shaft 55 and a head 58 having an axially extending trunnion 74 journalled in and extending through the trunnion 73 of casing head 52 and in which head one end of the shaft 55 has a pilot bearing 75. The frame heads are connected by bars 59 connected at the ends to diametrically opposite portions of said heads. Disks 60, similar in construction and arrangement to the disks 34, are connected to the bars 59 in the whipping zone in a manner similar to the connecting of the disks 34 to the frame bars 39 in the casing 10 with the disks 60 disposed between and spaced from the disks 56. Paddles 62 similar in structure to the paddles 42 are connected to and carried by the frame bars 59 in the portion of the casing 50 constituting the zone in which the plastic cream is changed into butterfat granules and buttermilk in a manner similar to connecting the paddles to the frame in the casing 14 disposed between and spaced from the paddles 61. The disk and paddle carrying shaft 55 and the disk and paddle carrying frame 57, 58, 59 are rotated in opposite directions from a suitable source of power, such as electric motors M connected to the projecting end of the shaft 55 and the projecting end of the trunnion 74 of the frame head 58.

The operation of the apparatus shown in Figure 3 is similar to that shown in Figure 2. The shaft 55 and the disk and paddle or blade carrying frame 57, 58, 59 are rotated in opposite directions, the fluid cream passing through the casing inlet into the casing 50 between the disks which act on the fluid cream to change or convert it into plastic cream. The plastic cream passes relative to the revolving blades 61, 62 which act to change the plastic cream into a mixture of agglomerated butterfat granules and buttermilk which is discharged through the outlet of the casing. The casing 50 is maintained substantially full of the material undergoing treatment and thus substantially devoid of air.

Investigation has demonstrated that the greatest efficiency is obtained in the production of plastic cream by agitation of the fluid cream continuously passed through a casing and subjecting the same to the action of disks with alternate disks rotating in opposite directions in planes substantially at a right angle to the direction of flow of the cream. The surfaces of the disks should be solid, that is, have no openings through which the cream may flow. The efficiency of the disks is according to the smoothness of the surfaces of the disks. For instance, disks which are radially fluted or corrugated with the portions between the corrugations arranged to slightly concave form in cross section with the peripheral portion thereof crimped or flanged laterally in the direction of the convex surface of said portions and the concavity against the direction of flow of the fluid cream are more efficient than those with smooth surfaces. The rapidity at which the disks are rotated is also important and for most purposes it has been found that rotating the disks at from 750 to 2000 revolutions per minute is suitable. The disks may be rotated at higher or lower speeds, but greater efficiency of operation and treatment of the cream is obtained within the range mentioned. Control of temperature is also necessary during the stages of whipping and agglomerating of the fat globules of the plastic cream into granules and masses and this should be less than that of the melting point of the butter fat, a temperature within the range of from 40 to 50 degrees Fahrenheit being suitable.

The following example will illustrate the steps of carrying out my invention of making butter from fluid cream. In carrying out the first step there is utilized a casing, such as the casing 10, three inches in diameter and fifteen inches in length and rotating the disks therein at 1200 revolutions per minute. The fluid cream having a forty per cent butter fat content and maintained at approximately 48 degrees F. is passed through the casing under a pressure of fifteen pounds per square inch and converted into plastic cream in fifteen seconds, or at the rate of 800 pounds per hour.

In carrying out the second step of my invention of making butter from fluid cream; that is, agglomerating the fat globules of the plastic cream into granules and masses and converting the plastic cream into a mixture of butter granules and buttermilk, there is utilized a second casing, such as the casing 14, in the arrangement of Figure 2, said latter casing also having a diameter of three inches and fifteen inches in length and rotating the paddles or blades therein at 1200 revolutions per minute. The plastic cream discharged from the casing 10 in continuous sequence and while maintained at a temperature of approximately 48 degrees F. is passed through the casing 14 under a pressure of fifteen pounds per square inch and converting the plastic cream to a mixture of butter granules and buttermilk by the action of the blades at substantially the same rate the fluid cream is converted into plastic cream. The 800 pounds of plastic cream produced and discharged from the casing 10 is passed through the casing 14 per hour and producing approximately 400 pounds of butter per hour. Should the dimensions of casings 10 and 14 be increased to a diameter of five inches and twenty-five inches in length then the quantity of fluid cream treated can be sufficient to produce 1852 pounds of butter per hour.

It has been found that the treatment of the plastic cream can be effected more efficiently by the use of paddles or blades the faces of which are smooth and parallel to the axis of the casing or direction of flow of the plastic cream therethrough. Said blades not only offer obstruction to the flow of the plastic cream, but also the revolving of the blades more efficiently impart impacts to the plastic cream and quickly changes it into butter granules and masses and buttermilk.

It will be apparent there are several variables in carrying out the invention, all of which must be controlled. Variations in the temperature and in the speed of rotation of the disks. Another variable is the rate at which the material passes through the apparatus. The rate of flow of the fluid cream into and through the agitating or whipping zone and the flow of the plastic cream through the second agitating zone are dependent upon several factors. For illustrative purposes data has been given for one set of conditions: Diameter and length of the casing, butter fat in the fluid cream, revolutions of disks and blades per minuet; temperature and time of treatment. I do not limit myself to such conditions, as increasing the diameter and length of the casing and decrease in the percentage of butter fat in the fluid cream and rotation of the disks and blades necessitate a longer period of treatment; that is, a lower rate of flow of the material. The requisite rate of flow can be readily determined for a given set of conditions and should be maintained substantially constant and may be controlled by the pump.

In the arrangement of Figure 3 wherein the zone in which the fluid cream is converted into plastic cream is arranged at one end portion of the casing 50, and the zone wherein the plastic cream is converted into a mixture of butter granules and buttermilk is arranged at the opposite end portion of the casing. To produce approximately 400 pounds of butter per hour the casing is three inches in diameter and approximately thirty inches long, and the disks and blades are rotated at 1200 revolutions per minute. The fluid cream is fed into and passed through the casing under a pressure of fifteen pounds per square inch, and the fluid cream is converted into plastic cream and the latter into a mixture of butterfat granules and buttermilk in thirty seconds. The cream is maintained while under treatment at a temperature of approximately 48 degrees F. By an increase in the diameter and length of the casing an increased quantity of fluid cream may be fed into the casing and treated and produce a proportionally increased quantity of butter.

Having described my invention, I claim:

1. In apparatus for making butter from fluid cream, a cylindrical casing for fluid cream having an inlet to one end and an outlet from the opposite end, two members extending longitudinally of the casing and rotatable independently of each other, two series of spaced disk members on said members in said casing, each disk member arranged with radial flutes spaced equidistantly about the same and the peripheral portion of the disk member between the flutes crimped laterally, and means to continuously rotate the two members and series of disk members in opposite directions.

2. In apparatus for making butter, an elongated cylindrical casing for fluid cream having an inlet to one end and an outlet from the opposite end, a shaft and a frame mounted in the casing to extend longitudinally of the casing and have independent rotation, disks having circumferentially spaced radial flutes in one face thereof and the peripheral portions of the disks between the flutes crimped laterally to extend from the face in which the flutes are arranged, said disks being closely spaced from each other and extending inward from the inlet end of the casing and alternate disks mounted on the shaft and frame to rotate therewith, radial blades spaced inward from the outlet end of the casing and alternate blades mounted on the shaft and frame to rotate therewith, the faces of said blades extending substantially parallel of the shaft and spaced from one another with the edges in close proximity, and motive means for continuously rotating said shaft and frame with the disks and blades in opposite directions.

CHARLES E. NORTH.

REFERENCES CITED

The following references are of record in the file of this patent:

UNITED STATES PATENTS

| Number | Name | Date |
| --- | --- | --- |
| 798,837 | Stanley | Sept. 5, 1905 |
| 908,887 | Risberg | Jan. 5, 1909 |
| 1,276,910 | Heller | Aug. 27, 1918 |
| 1,650,625 | Hapgood | Nov. 29, 1927 |
| 1,863,452 | Rowland | June 14, 1932 |
| 1,885,626 | Quaedvlieg | Nov. 1, 1932 |
| 2,020,878 | Doering | Nov. 12, 1935 |
| 2,039,162 | Gerstenberg | Apr. 28, 1936 |
| 2,098,179 | Devenney | Nov. 2, 1937 |
| 2,108,696 | Troutner | Feb. 15, 1938 |
| 2,219,656 | Miller | Oct. 29, 1940 |
| 2,351,458 | Senn | June 13, 1944 |